US011816616B2

(12) United States Patent
Chen et al.

(10) Patent No.: US 11,816,616 B2
(45) Date of Patent: Nov. 14, 2023

(54) WORKFLOW SCHEDULING AND OPTIMIZATION TOOLS

(71) Applicant: INTERNATIONAL BUSINESS MACHINES CORPORATION, Armonk, NY (US)

(72) Inventors: David S. C. Chen, Taipei (TW); Kuo-Liang Chou, Taipei (TW); June-Ray Lin, Taipei (TW); Pohsun Tseng, New Taipei (TW); Der-Joung Wang, New Taipei (TW)

(73) Assignee: International Business Machines Corporation, Armonk, NY (US)

(*) Notice: Subject to any disclaimer, the term of this patent is extended or adjusted under 35 U.S.C. 154(b) by 1299 days.

(21) Appl. No.: 15/160,713

(22) Filed: May 20, 2016

(65) Prior Publication Data
US 2017/0337492 A1 Nov. 23, 2017

(51) Int. Cl.
*G06Q 10/06* (2023.01)
*G06Q 10/10* (2023.01)
(Continued)

(52) U.S. Cl.
CPC ... *G06Q 10/0633* (2013.01); *G06Q 10/06316* (2013.01); *G06Q 10/109* (2013.01)

(58) Field of Classification Search
CPC ............ G06Q 10/0633; G06Q 10/109; G06Q 10/06316
See application file for complete search history.

(56) References Cited

U.S. PATENT DOCUMENTS

| 5,907,829 A | * | 5/1999 | Kida | ............. G06Q 10/063116 |
| | | | | 705/7.16 |
| 6,415,259 B1 | * | 7/2002 | Wolfinger | ........ G06Q 10/06311 |
| | | | | 705/7.13 |

(Continued)

FOREIGN PATENT DOCUMENTS

WO WO-2014031917 A1 * 2/2014 ............. G06Q 10/06

OTHER PUBLICATIONS

Javier Diaz-Montes, Supporting Data-Intensive Workflows in Software-Defined Federated Multi-Clouds, 2015 IEEE Transactions on Cloud Computing (Year: 2015).*

(Continued)

*Primary Examiner* — Shelby A Turner
*Assistant Examiner* — Matthew H Divelbiss
(74) *Attorney, Agent, or Firm* — Schmeiser, Olsen & Watts, LLP; Aaron Pontikos

(57) ABSTRACT

Computing systems, methods and management tools for scheduling, optimizing and completing a dynamically adjustable workflow process. The computing systems, methods and management tools being capable of evaluating the availability of resources available for completing the workflow process and ascertaining the reliability of the resources in order to pre-generate a workflow process schedule. The computing systems, methods and management tools are further able to communicate with the assigned resources to incrementally negotiate and receive approval for proposed improvements to the pre-generated workflow schedule prior to implementation of the workflow schedule in order to optimize the cycle time of the process and increase probability of successfully completing the workflow process. The computing systems, methods and management tools may dynamically track the due dates for completing par- (Continued)

ticular tasks and generate amended workflow process schedules in the event a failure occurs.

11 Claims, 11 Drawing Sheets

(51) Int. Cl.
*G06Q 10/0633* (2023.01)
*G06Q 10/0631* (2023.01)
*G06Q 10/109* (2023.01)

(56) References Cited

U.S. PATENT DOCUMENTS

| | | | | |
|---|---|---|---|---|
| 6,463,346 | B1* | 10/2002 | Flockhart | G06Q 10/10 379/266.01 |
| 7,499,715 | B2 | 3/2009 | Carro et al. | |
| 8,078,487 | B2* | 12/2011 | Li | G06Q 10/063116 705/7.22 |
| 8,136,114 | B1* | 3/2012 | Gailloux | G06Q 10/06 718/104 |
| 8,583,467 | B1* | 11/2013 | Morris | G06Q 10/06316 705/7.22 |
| 8,645,182 | B2 | 2/2014 | Johnson et al. | |
| 8,744,890 | B1* | 6/2014 | Bernier | G06Q 10/06316 705/7.16 |
| 8,849,688 | B2 | 9/2014 | Cash, Jr. et al. | |
| 10,120,722 | B2* | 11/2018 | Hamway | G06F 9/4881 |
| 10,552,774 | B2* | 2/2020 | Shih | G06Q 10/06315 |
| 2008/0301296 | A1 | 12/2008 | York | |
| 2009/0119126 | A1* | 5/2009 | Johnson | G16H 40/20 705/2 |
| 2011/0093538 | A1 | 4/2011 | Weir et al. | |
| 2011/0282709 | A1 | 11/2011 | Rangaswamy et al. | |
| 2011/0302004 | A1* | 12/2011 | Johnson | G06Q 10/06313 705/7.42 |
| 2014/0136255 | A1* | 5/2014 | Grabovski | G06Q 10/063112 705/7.14 |
| 2014/0142998 | A1* | 5/2014 | Kroeger | G06Q 10/06311 705/7.13 |
| 2014/0164189 | A1* | 6/2014 | Escobar Olmos | G06Q 30/0637 705/26.82 |
| 2014/0229215 | A1* | 8/2014 | Bernier | G06Q 10/0631 705/7.16 |
| 2015/0051916 | A1* | 2/2015 | Vdovjak | G06Q 10/0631 705/2 |
| 2015/0310362 | A1* | 10/2015 | Huffman | G06Q 50/22 705/2 |
| 2016/0307145 | A1* | 10/2016 | Banerjee | G06Q 10/063116 |
| 2017/0091697 | A1* | 3/2017 | Haas | G06Q 10/06316 |
| 2017/0249574 | A1* | 8/2017 | Knijnik | G06Q 10/06313 |

OTHER PUBLICATIONS

Xu, Jiajie et al.; Business Process Scheduling with Resource Availability Constraints; On the Move to Meaningful Internet Systems: OTM 2010; Lecture Notes in Computer Science, vol. 6426; 2010; pp. 419-427.

Anonymous; Technique for automatic human task assignment in BPM using machine learning model; IP.com; IPCOM000234678D; Jan. 28, 2014; 6 pages.

Mell, Peter et al.; "The NIST Definition of Cloud Computing;" National Institute of Standards and Technology; Special Publication 800-145; Sep. 2011; 7 pages.

* cited by examiner

WORKFLOW SCHEDULING AND OPTIMIZATION TOOLS

TECHNICAL FIELD

The present disclosure relates generally to workflow management tools and methods for scheduling and completing workflow generated processes.

BACKGROUND

Workflow management provides an infrastructure for the set-up, performance and monitoring of defined tasks in a process that may be arranged as a workflow. A workflow may be a mechanism that aims to manage people, data, applications and business processes throughout an organization, including external partners. Projects and processes performed as part of the workflow may utilize multiple human and physical resources to complete individual tasks. The management of the workflow can require coordination between each of the resources directed with completing individual tasks that are part of the process. Often, the resources assigned to complete particular tasks of the workflow may be located in geographically remote locations or otherwise unable to be present in the same location. Tasks may require resources to be coordinated remotely. Individual tasks of a workflow process may depend on the completion of a previous task before starting and completing a subsequent task. A delay in completing any previous tasks at any stage of the process may have a cascading effect which may in turn delay the completion of the subsequent tasks, therefore delaying the completion of the entire process.

Currently available computerized management tools may improperly assume that each of resources that may be assigned a task, as part of the workflow, are presently capable, ready and able to complete the task once it has been assigned and within the time frame allotted for completion. In reality however, resources requested for the completion of a process may often be conducting business away from their computer systems, or unable to fulfill the request. This may particularly true when the individuals being relied upon are management level individuals of an enterprise who have very busy schedules. Assigning tasks to a management level individual can be difficult when they are consistently away from their computing system. Often, workflow management relies on the secretaries of the manager level individuals to schedule tasks for completion in a manner that fits into the schedules of the managers.

While relying on secretaries may assist in completing the tasks of the workflow processes, having to wait and schedule the performance of the tasks can cause delays resulting in an increased cycle time and incidentally limit the resources that may be available for completing subsequent tasks. Accordingly, a need exists in the art for a workflow management tool that automatically preschedules for completion each task of the workflow process and continuously optimizes the completion of the workflow in order to complete the process in the most efficient and reliable manner possible.

SUMMARY

A first embodiment of the present disclosure provides a method for scheduling and optimizing completion of a workflow process comprising the steps of creating, by a processor of a computing system, the workflow process comprising a plurality of tasks; organizing, by the processor, task service data for plurality of tasks of the workflow process into a tiered hierarchy as a function of one or more dependencies for completing each task of the plurality of tasks; retrieving, by the processor, calendar service data of each task candidate; generating, by the processor, a workflow process schedule as a function of the calendar service data and the task service data, wherein the workflow process schedule includes due dates for each task assigned to each task candidate; and negotiating, by the processor, an improved workflow process schedule having at least one improved parameter over the workflow process schedule.

A second embodiment of the present disclosure provides a computer program product, comprising one or more computer readable hardware storage devices having computer readable program code stored therein, said program code containing instructions executable by the one or more computer processors to schedule and optimize completion of a workflow process said method comprising the steps of one or more computer readable hardware storage devices having computer readable program code stored therein, said program code containing instructions executable by the one or more computer processors to implement a method for scheduling and optimizing completion of a workflow process comprising the steps of: creating, by a processor, the workflow process having a plurality of tasks; organizing, by the processor, each task of the workflow process into a tiered hierarchy as a function of one or more dependencies for completing each task; retrieving, by the processor, calendar service data of each task candidate; generating, by the processor, a workflow process schedule as a function of the calendar service data and the tiered hierarchy, wherein the workflow process schedule includes due dates for each task assigned to each task candidate; and negotiating, by the processor, an improved workflow process schedule having at least one improved parameter over the workflow process schedule.

A third embodiment of the present disclosure provides a computer system, comprising: one or more processors; one or more memories coupled to the one or more computer processors; and one or more computer readable storage devices coupled to the one or more processors, wherein the one or more storage devices contains program code executable by the one or more processors via one or more memories to implement a method for scheduling and optimizing completion of a workflow process comprising the steps of: creating, by the one or more processors, the workflow process having a plurality of tasks; organizing, by the one or more processors, each task of the workflow process into a tiered hierarchy as a function of one or more dependencies for completing each task; retrieving, by the one or more processors, calendar service data of each task candidate; generating, by the one or more processors, a workflow process schedule as a function of the calendar service data and the tiered hierarchy, wherein the workflow process schedule includes due dates for each task assigned to each task candidate; and negotiating, by the one or more processors, an improved workflow process schedule having at least one improved parameter over the workflow process schedule.

DETAILED DESCRIPTION

Figure 1:
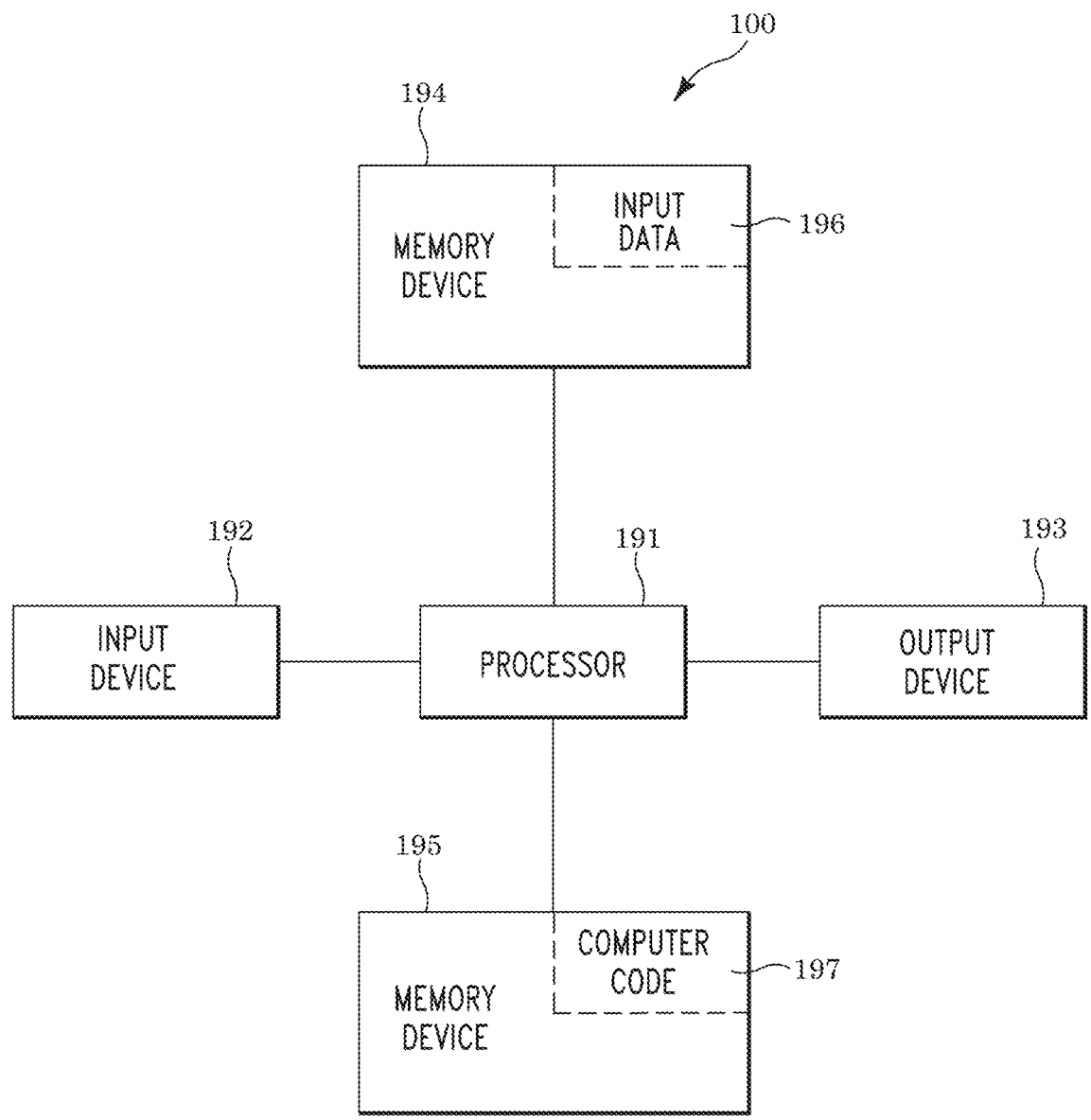
FIG. 1 illustrates an embodiment of a computer system used for implementing workflow management tools, methods and systems consistent with embodiments of the present disclosure.

Referring to the drawings, FIG. 1 illustrates a computer system 100 used for scheduling and optimizing the completion of a workflow process of the present disclosure. The computer system 100 may comprise a processor 191, an input device 192 coupled to the processor 191, an output device 193 coupled to the processor 191, and memory devices 194 and 195 each coupled to the processor 191. The input device 192 may be, inter alia, a keyboard, a mouse, etc. The output device 193 may be, inter alia, a printer, a plotter, a display device (such as a computer screen), a magnetic tape, a removable hard disk, a floppy disk, etc. The memory devices 194 and 195 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 195 includes a computer code 197 which may be a computer program that comprises computer-executable instructions. The computer code 197 includes software or program instructions that may implement an algorithm for scheduling and optimizing the completion of the workflow process. The processor 191 executes the computer code 197. The memory device 194 includes input data 196. The input data 196 includes any inputs required by the computer code 197. The output device 193 displays output from the computer code 197. Either or both memory devices 194 and 195 (or one or more additional memory devices not shown in FIG. 1) may be used as a computer usable storage medium (or program storage device) having a computer readable program embodied therein and/or having other data stored therein, wherein the computer readable program comprises the computer code 197. Generally, a computer program product (or, alternatively, an article of manufacture) of the computer system 100 may comprise said computer usable storage medium (or said program storage device).

Thus the present invention discloses a process for supporting, deploying and/or integrating computer infrastructure, integrating, hosting, maintaining, and deploying computer-readable code into the computer system 100, wherein the code in combination with the computer system 100 is capable of performing a method for scheduling and optimizing the completion of a workflow process.

While FIG. 1 shows the computer system 100 as a particular configuration of hardware and software, any configuration of hardware and software, as would be known to a person of ordinary skill in the art, may be utilized for the purposes described herein with the particular computer system 100 of FIG. 1. For example, the memory devices 194 and 195 may be portions of a single memory device rather than separate memory devices.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2A:
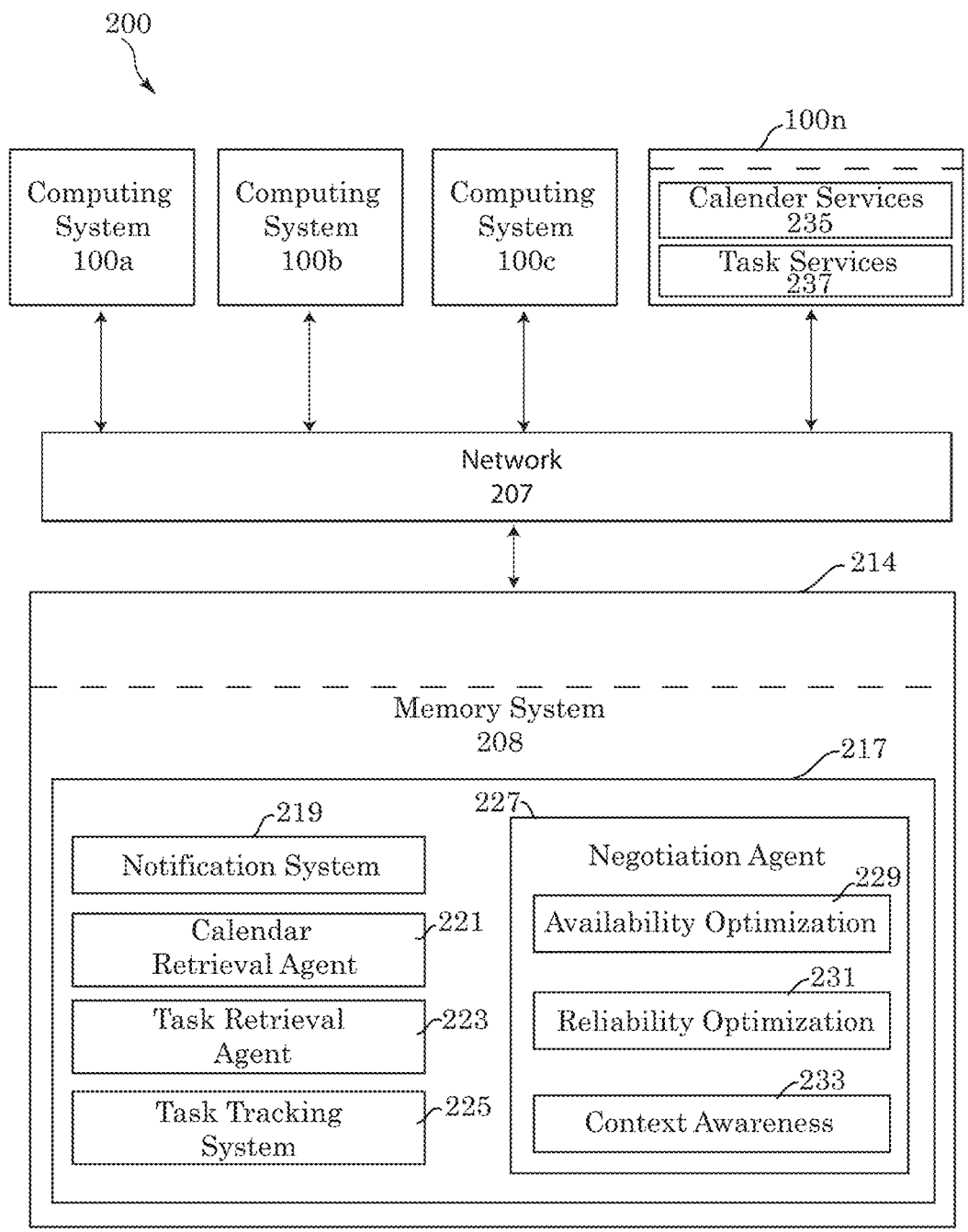
FIG. 2a depicts an embodiment of a computing network for implementing embodiments of the present disclosure.

FIG. 2a depicts an embodiment of a computing network 200 comprised of computing systems 100 for scheduling and optimizing the completion of a workflow process. The embodiment of the computing network 200 may include one or more nodes 100a, 100b, 100c up to the last computing system depicted as computing system 100n, each of which may be connected through a network 207 to a workflow owner computing system 214. There are not any limitations of the number of nodes that may be connected to the network 207. Rather, nodes 100a, 100b, 100c . . . 100n are meant to demonstrate that a plurality of one or more nodes may be connected to the network 207 and said nodes may communicate over network 207 with the workflow owner computing system 214 as well as each of the other nodes and/or computing resources connected to computer network 200.

Embodiments of the nodes 100a, 100b, 100c . . . 100n may be computing systems or other computing resources operated by task candidates who may be assigned one or more tasks of the workflow process scheduled for being completed by the workflow owner computing system 214. A "task candidate" may refer to a potential individual, user, role, group, computing system or computing resource that may be assigned to perform and complete a particular task of a workflow process. In some embodiments, one or more of the nodes 100a, 100b, 100c . . . 100n, connected to network 207 may a computer system 100 as described above and shown in FIG. 1. In the exemplary embodiments described herein, the network 207 may be an enterprise network and each of the nodes 100a, 100b, 100c . . . 100n may comprise computing systems 100 which may be operated by users, contractors, employees, groups thereof, assigned roles comprising groups of users, other computing resources or assets of the enterprise which may be utilized for completing and optimizing the embodiments of the workflow processes described in this application.

In some embodiments, one or more of the computing systems 100, acting as nodes 100a, 100b, 100c . . . 100n on the network 207 may communicate over the network 207 with the workflow owner computing system 214, which may also be considered a node on the network 207. Network 207 may include any type of network including, inter alia, a local area network, (LAN), a wide area network (WAN), the Internet, a wireless network, etc. Nodes 100a . . . 100n and workflow owner computing system 214 may include any type of computing system(s) including, inter alia, a computer (PC), a laptop computer, a tablet computer, a server, a PDA, a smart phone, etc. Computing system 214 may also include any type of computing system(s) including, inter alia, a computer (PC), a laptop computer, a tablet computer, a server, etc.

Similar to computing system 100, workflow owner computing system 214 may include a memory system 208. Memory system 208 may include a single memory system or alternatively a plurality of memory systems. Memory system 208 may include workflow management tools 217 comprising computer programming code to perform the function of scheduling and optimizing the completion of a workflow process in accordance with the algorithms described here. As shown in the exemplary embodiment of FIG. 2a, the workflow management tools 217 loaded in the memory system 208 of the workflow owner computing system 214 may include several modules. In some embodiments, the modules of the workflow management tools 217 may include a notification system 219, a calendar retrieval agent 221, a task retrieval agent 223, a task tracking system 225 and/or a negotiation agent 227. Embodiment of the negotiation agent 227 may further comprise modules for availability optimization 229, reliability optimization 231 and context awareness 233. In some embodiments, the embodiments of the nodes 100a, 100b, 100c . . . 100n may also have the workflow management tools 217 loaded in the memory of the computing systems of the nodes 100a, 100b, 100c . . . 100n.

Embodiments of the notification system 219 may include software and/or a combination of hardware or specialized circuitry to communicate information between each nod of the computer network 200. The notification system 219 may provide a means for delivering messages regarding the workflow process to the task candidates via network 207 to the nodes 100a, 100b, 100c . . . 100n and/or the workflow owner computing system 214. The notification system 219 may be used to communicate information relating to the assignment of a task, the task's assigned due date, changes to the task due date and negotiation or renegotiation of an assigned task due date, including an offer and acceptance of the proposed due date during negotiation or renegotiation of the task of the workflow process. Embodiments of the notification system may communicate by sending emails or in other embodiments the notification system 219 may include a messaging service for facilitating communication between the nodes 100a, 100b, 100c . . . 100n of the network 207 and the workflow owner computing system 214.

Figure 2B:
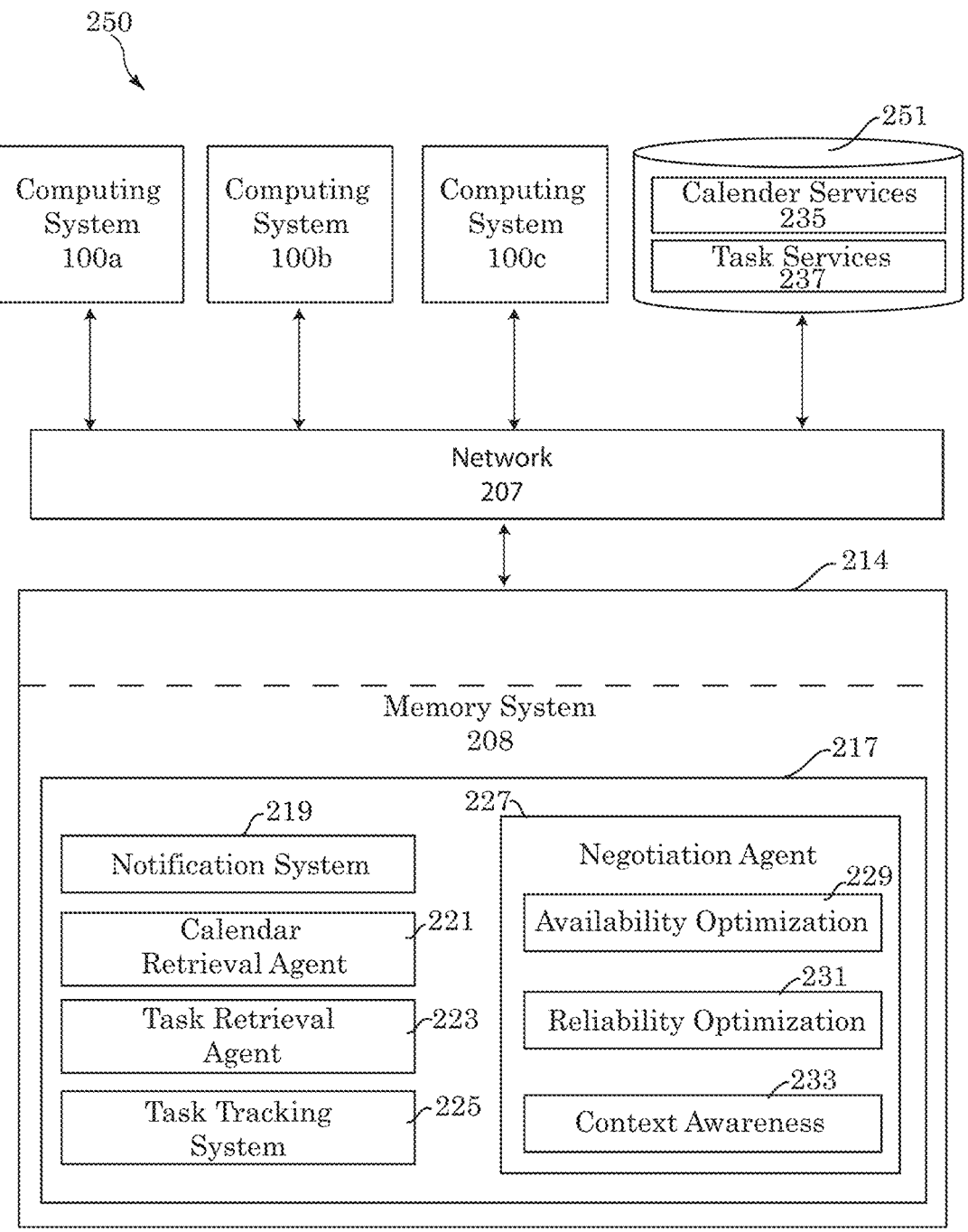
FIG. 2b depicts an alternative embodiment of a computer network for implementing the embodiments of the present disclosure.

Embodiments of the calendar retrieval agent 221 and the task retrieval agent 223 may include programs, applications, clients or services capable of querying, retrieving and/or downloading data from calendar services 235 and task services 237 respectively from the nodes 100a, 100b, 100c . . . 100n or other computing resources connected to the network 207 such as a server or repository. In the embodiment shown in FIG. 2a, the calendar retrieval agent 221 and the task retrieval agent 223 may request and receive calendar service data or task service data stored on one or more of nodes 100a, 100b, 100c . . . 100n of network 207. In other embodiments, the nodes 100a, 100b, 100c . . . 100n may each synchronize the calendar service data or task service data on each of the individual nodes 100a, 100b, 100c . . . 100n with a centralized node on the network 207. Instead of the calendar retrieval agent 221 or task retrieval agent 223 having to retrieve the calendar services data or task services data from each node 100a, 100b, 100c . . . 100n on the network 207, the calendar retrieval agent 221 or task retrieval agent 223 may receive the data from the calendar services 235 or task services 237 loaded onto a single computing system such as central server. In the alternative embodiment shown in FIG. 2b, a central repository 251 or data store may be added to the network 207, store calendar service and task service data accessible by the nodes 100a, 100b, 100c . . . 100n and the workflow owner computing system 214.

Embodiments of the calendar services 235 may save or record events and appointments of each task candidate on an electronic calendar or datebook. The data retrieved from the calendar services 235 by the workflow management tools 217 may inform the decision making algorithms of the workflow management tools 217 loaded on the workflow owner computing system 214 about the availability of each task candidate. With the information provided by calendar service data, the workflow management tools 217 may determine whether or not a task candidate is available to complete a particular task of the workflow process, the task candidate's soonest availability for completing the task, the expected cycle time for completing a workflow process and further determine whether or not a task candidate should be assigned to perform a task based on the task candidate's availability. Using the calendar services data retrieved from the calendar services 235, the workflow management tools may generate a workflow process schedule, taking into consideration the availability of each possible task candidate.

Embodiments of the task retrieval agent 223 may receive and record data information electronically stored by the task services 237. Task services 237 may track, remind and electronically store information regarding one or more tasks assigned to task candidates. Task services 237 may track and remind the task candidates about upcoming due dates for assigned tasks, and report to the task tracking system 225 whether or not the assigned tasks being tracked by the task services 237 have been completed prior to the assigned due date. Task service 237 and/or the task tracking system 225 of the workflow management tools 217 may also store a history of task candidates' complete and incomplete tasks. If, a task assigned to the task candidate has not been completed by the due date, the task retrieval agent 223 receiving the task service data may note the missed deadline, update the missed task deadline in the task tracking system 225 and alert the workflow owner computing system 214 and/or the computing system of the task candidate about the missed task due date. In some embodiments, the workflow management tools 217 may manually or automatically generate a new workflow schedule and simultaneously or near simultaneously update the task services 237 of the task candidate's computing system to reflect the new due date of the task.

Embodiments of the negotiation agent 227 of the task management tools 217 may include program code and/or a set of programmed instructions containing algorithms for scheduling and optimizing the assignment of tasks of the workflow process to particular task candidates based on the calendar service data and task service data of the task candidates. The negotiation agent 227 may responsible for prescheduling the workflow process schedule prior to implementation the workflow process schedule, and further perform the actions of negotiating a more optimized workflow schedule, once prescheduling has been performed.

In some embodiments of the negotiation agent 227, the negotiation agent 227 may further include an availability optimization module 229, which may compare the calendar service data retrieved by the calendar retrieval agent 221 from each task candidate, in order to identify a scheduling solution for completing the workflow process in a time efficient manner having a low cycle time. The availability optimization module may calculate a plurality of workflow scheduling solutions with not only the lowest cycle time, but may also perform the action of optimizing the cycle time, wherever possible during the negotiation phase of optimizing the particular workflow process tasks.

Embodiments of the negotiation agent 227 may also comprise a reliability optimization module 231. Embodiments of the reliability optimization module 231 may retrieve and analyze task service data and profile information collected about the task candidates from one or more data sources to determine the reliability of a task candidate. The reliability optimization module 231 may use the data collected from the task services 237, task retrieval agent 223, the task tracking system 225 and other additional data sources to calculate a reliability score and/or determine a probability that a task assigned to a particular task candidate will be completed within the time frame scheduled by the workflow management tools 217. By taking into account the reliability of a task candidate, along with the availability of a task candidate, the workflow management tools 217 can use the context awareness module 233 to read the calendar data, understand the workflow history of task candidates, then identify and select a workflow scheduling solution that is a balance of both low cycling time but also has high probability of succeeding.

Ideally, in an exemplary embodiment, the algorithm of the workflow management tools 217 may seek to select a workflow scheduling solution, based on the availability and reliability data of the task candidates, wherein the assigned workflow process tasks are assigned task candidates that have the lowest cycle time for completion and have the highest probability of success. However, the workflow process management tools 217 may recognize that having the lowest cycle time and the highest probability of success may not always be an option. Often, the most reliable task candidates may have some of the most difficult availability to schedule. Therefore, in some embodiments, the workflow management tools 217 may identify and select a workflow scheduling solution that provides a balance between both availability and reliability of the selected task candidates. The negotiation agent 227 of the workflow management tools 217, however may continuously seek to optimize the initial workflow schedule selected in order to make adjustments that improve the cycle time and/or the probability of a task's success, wherever possible.

Figure 3:
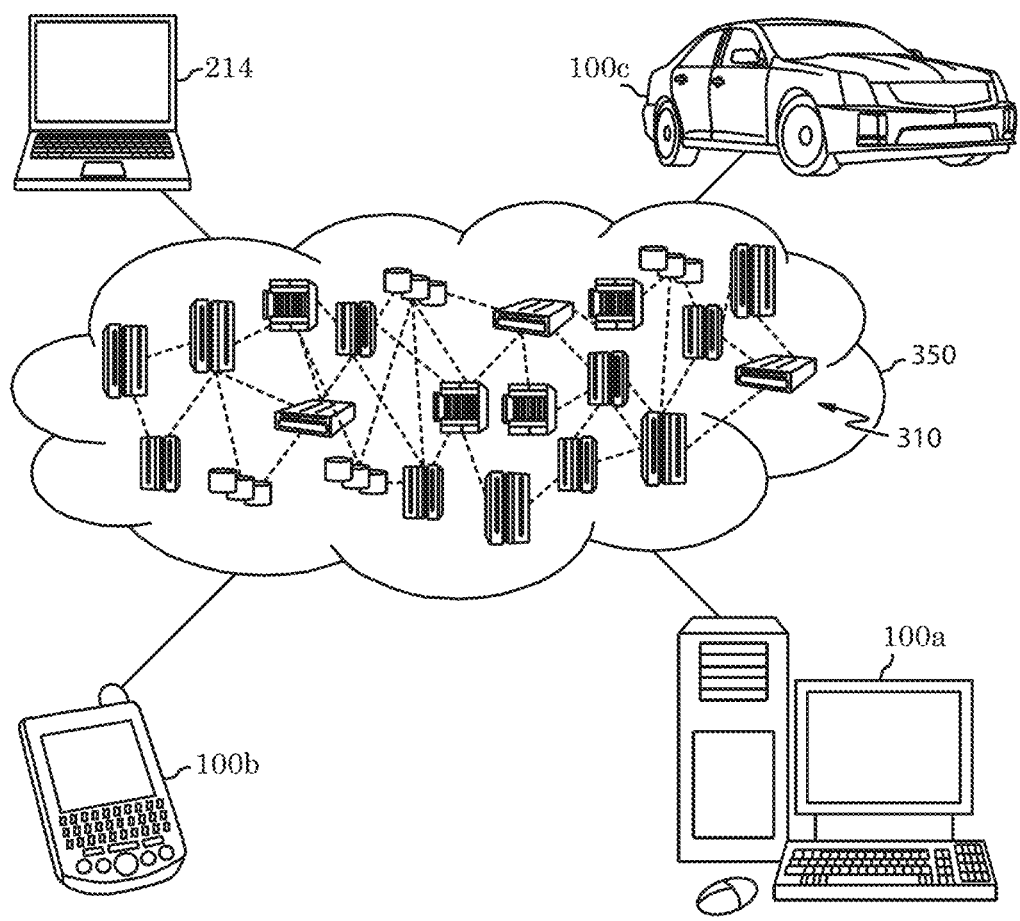
FIG. 3 depicts an embodiment of a cloud computing network for implementing embodiments of the present disclosure.

In some embodiments, the computing systems of the task candidates and the workflow owner may be part of a computer network 207 that is a cloud computing network operating under a cloud computing environment 350 (as shown in FIG. 3). Cloud computing may be referred to as a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Embodiments of a cloud computing model may include one or more of at least five characteristics, at least three service models, and at least four deployment models.

Characteristics of a cloud computing environment may include on-demand self-service, broad network access, resource pooling, rapid elasticity and measured service. The term "on-demand self-service" may refer to a characteristic of a cloud computing environment 350 that may allow a tenant of the cloud environment 350 to unilaterally provision computing capabilities, such as server time and network storage, as needed, automatically without requiring human interaction with the owner of the cloud environment 350.

"Broad network access" may refer to the capabilities available over the network which may be accessed through standard mechanisms that promote use by nodes 100a, 100b, 100c . . . 100n (e.g., mobile phones, laptops, and PDAs) accessing the cloud through the use of thin or thick client platforms.

"Resource pooling" may refer to the tenant's computing resources being pooled to serve multiple tenants using a multi-tenant model, with different physical and virtual resources dynamically assigned and reassigned according to demand. There is a sense of location independence in that the tenant may generally have no control or knowledge over the exact location of the provided resources but may be able to specify location at a higher level of abstraction (e.g., country, state, or datacenter).

"Rapid elasticity" refers to capabilities of the cloud network to rapidly and elastically provision, in some cases automatically, to quickly scale out and rapidly released to quickly scale in. To the tenant, the capabilities available for provisioning may appear to be unlimited and can be purchased in any quantity at any time.

"Measured service" may refer to cloud systems being able automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The service models for a cloud computing environment may include Software as a Service (SaaS), Platform as a Service (PaaS) and Infrastructure as a Service (IaaS). Software as a Service (SaaS) refers to the capability provided to the tenant to use the service provider's applications running on a cloud infrastructure. The applications are accessible from various client devices through a thin client interface such as a web browser (e.g., web-based e-mail). The tenant does not manage or control the underlying cloud infrastructure including network, servers, operating systems, storage, or even individual application capabilities, with the possible exception of limited user-specific application configuration settings.

Platform as a Service (PaaS) refers to the capability provided to the consumer to deploy onto the cloud infrastructure tenant-created or acquired applications created using programming languages and tools supported by one or more service providers. The tenant does not manage or control the underlying cloud infrastructure including networks, servers, operating systems, or storage, but has control over the deployed applications and possibly application hosting environment configurations. In contrast, Infrastructure as a Service (IaaS) refers to the capability provided to the tenant to provision processing, storage, networks, and other fundamental computing resources where the consumer is able to deploy and run arbitrary software, which can include operating systems and applications. The tenant does not manage or control the underlying cloud infrastructure but has control over operating systems, storage, deployed applications, and possibly limited control of select networking components (e.g., host firewalls).

Deployment models of a cloud computing environment 350 such as the one depicted in FIG. 3 may include a private cloud, community cloud, public cloud or hybrid cloud. A "private cloud" refers to cloud infrastructure that is operated solely for an organization. It may be managed by the organization or a third party and may exist on-premises or off-premises. A "community cloud" may refer to cloud infrastructure is shared by several organizations and supports a specific community that has shared concerns (e.g., mission, security requirements, policy, and compliance considerations). It may be managed by the organizations or a third party and may exist on-premises or off-premises.

A "public cloud" deployment model may refer to cloud infrastructure that is made available to the general public or a large industry group and is owned by an organization selling cloud services to one or more tenants. A "hybrid cloud" may refer to cloud infrastructure that is a composition of two or more clouds (private, community, or public) that remain unique entities but are bound together by standardized or proprietary technology that enables data and application portability (e.g., cloud bursting for load-balancing between clouds).

A cloud computing environment 350 may be considered service oriented with a focus on statelessness, low coupling, modularity, and semantic interoperability. At the heart of cloud computing environment may be an infrastructure comprising a network of interconnected nodes. Referring still to FIG. 3, illustrating an embodiment of a cloud computing environment 350, the cloud computing environment 350 may comprise one or more individual cloud computing nodes 100a, 100b, 100c, 214 with which local computing devices used by cloud tenants and/or services providers are connected to the cloud computing environment 350. The computing nodes 310 may include for example, desktop computer, personal digital assistant (PDA) or cellular telephone, automobile computer system, and/or laptop computer.

Nodes 310 may communicate with one another over the network of the cloud computing environment 350. The nodes 310 of the cloud computing environment 350 may be grouped (not shown) physically or virtually, in one or more networks, such as Private, Community, Public, or Hybrid cloud environment as described hereinabove, or a combination thereof. This allows cloud computing environment 350 to offer infrastructure, platforms and/or software as services for which a cloud consumer does not need to maintain resources on a local computing device 100. It is understood that the types of computing devices 100a-n shown in FIGS. 2a-3 are intended to be illustrative only and that computing nodes 310 and cloud computing environment 350 can communicate with any type of computerized device, such as the computer system depicted in FIG. 1 (described above), over any type of network 207 and/or network addressable connection.

Figure 4:
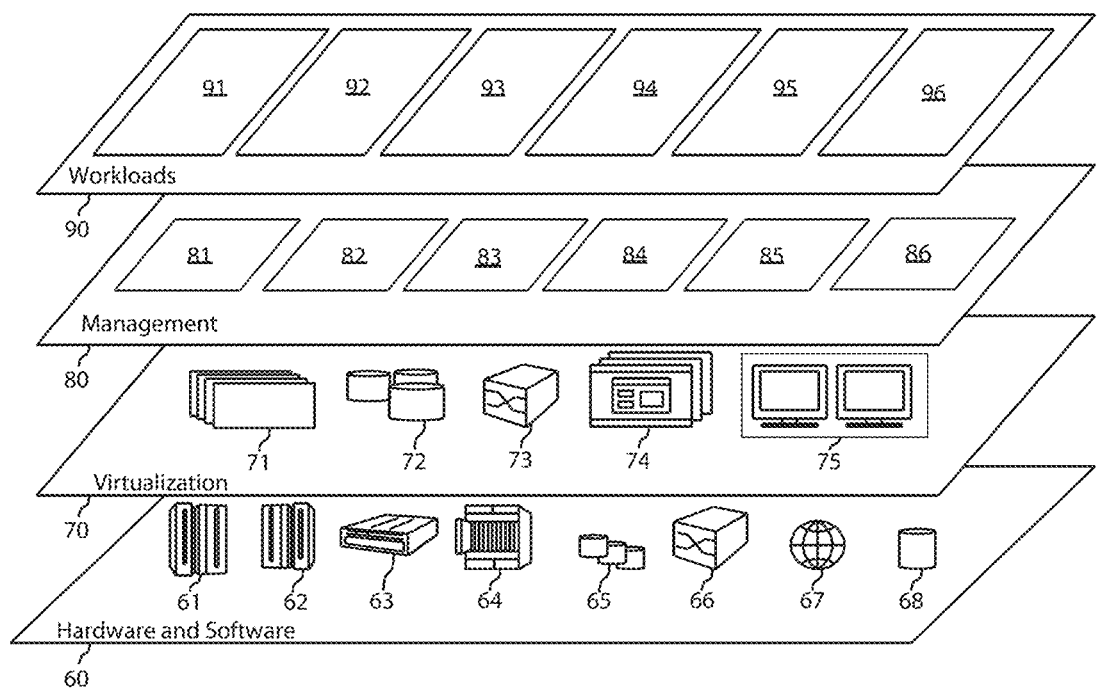
FIG. 4 depicts an embodiment of abstraction model layers of a cloud computing network implementing embodiments of the present disclosure.

Referring now to FIG. 4, a set of functional abstraction layers 60, 70, 80, 90 provided by cloud computing environment 350 is shown. It should be understood in advance that the components, layers, and functions shown in FIG. 4 are intended to be illustrative only and embodiments of the disclosed invention are not limited thereto. As depicted, the following layers and corresponding functions are described further below:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

The management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. User portal 83 provides access to the cloud computing environment 350 for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Identity verification 86 verifies the permission granted to customers and/or service providers to access to network based resources and perform tasks in the cloud based environment 50.

Workloads layer 90 provides examples of functionality for which the cloud computing environment may be utilized. Examples of workloads and functions which may be provided from this layer may include: calendar scheduling service 91; notification services 92; task services 93; data analytics processing 94; transaction processing 95; and workflow management tools 96 integrating a workflow task routing and negotiation protocol described herein. In the present disclosure, the workflow management tools of workload 96 may implement methods of scheduling and optimizing the completion of a workflow process as described in greater detail below.

Figure 5:
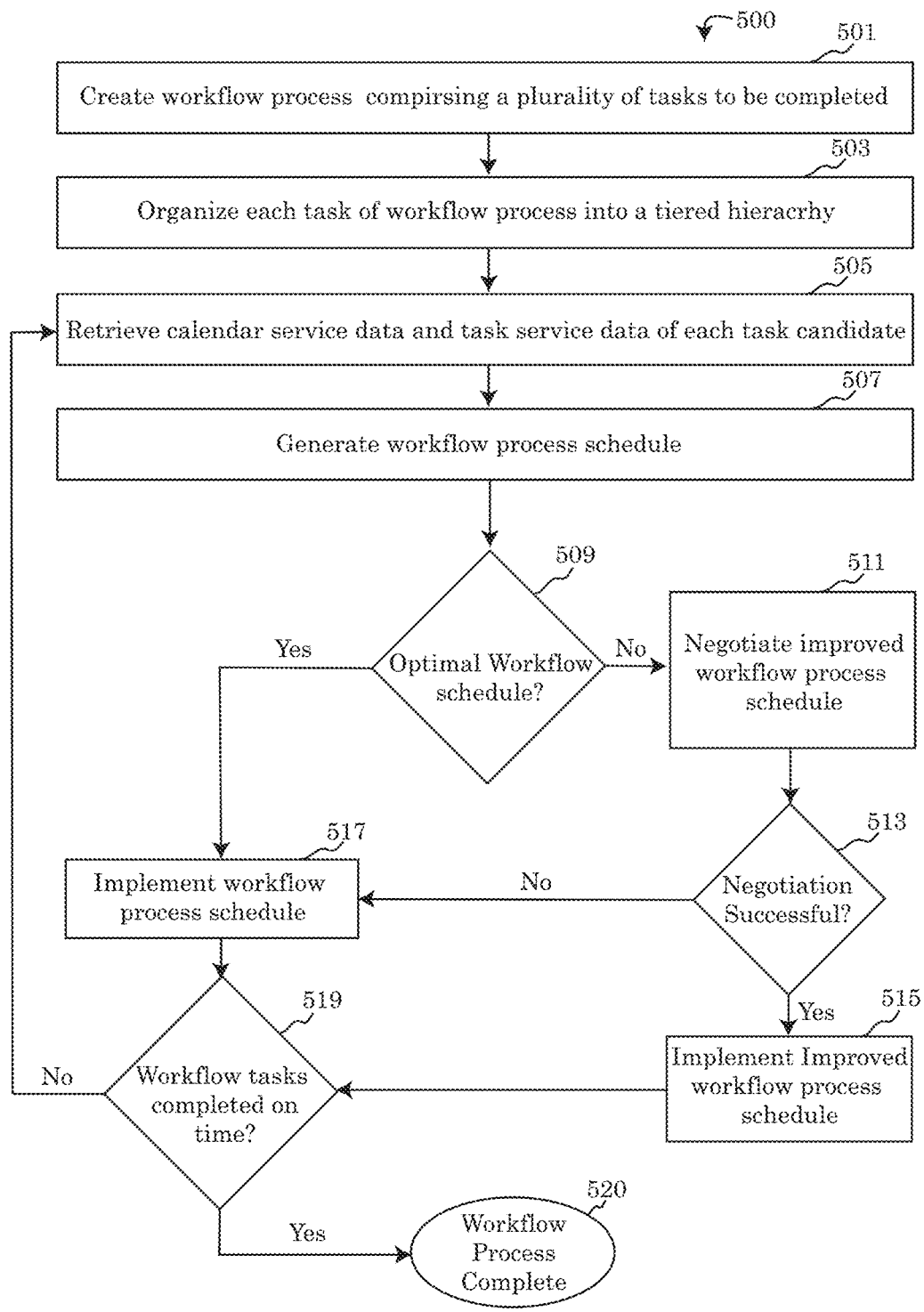
FIG. 5 depicts a high-level flow chart for implementing embodiments of the tools, methods and systems disclosed in the present application.

Referring to the drawings, FIG. 5 illustrates a high-level flowchart of an embodiment of an algorithm 500 that may be used by the workflow management tools 217 to create a workflow process, generate a workflow process schedule, optimize the workflow schedule, ensuring that the tasks of the workflow process schedule are completed on time, while also being capable of adjusting the workflow process schedule as necessary until the workflow process is completed. Beginning at step 501 of the workflow task routing and negotiation protocol algorithm 500, a workflow process owner may instruct the workflow management tools 217 to create a workflow process comprising a plurality of tasks to be completed. Embodiments of the tasks that make up the workflow process can be any task that may be known by those skilled in the art. The creation of the workflow process may be performed by a workflow owner computing system 214 having the workflow management tools 217 loaded in the memory system 208 thereof.

Figure 6:
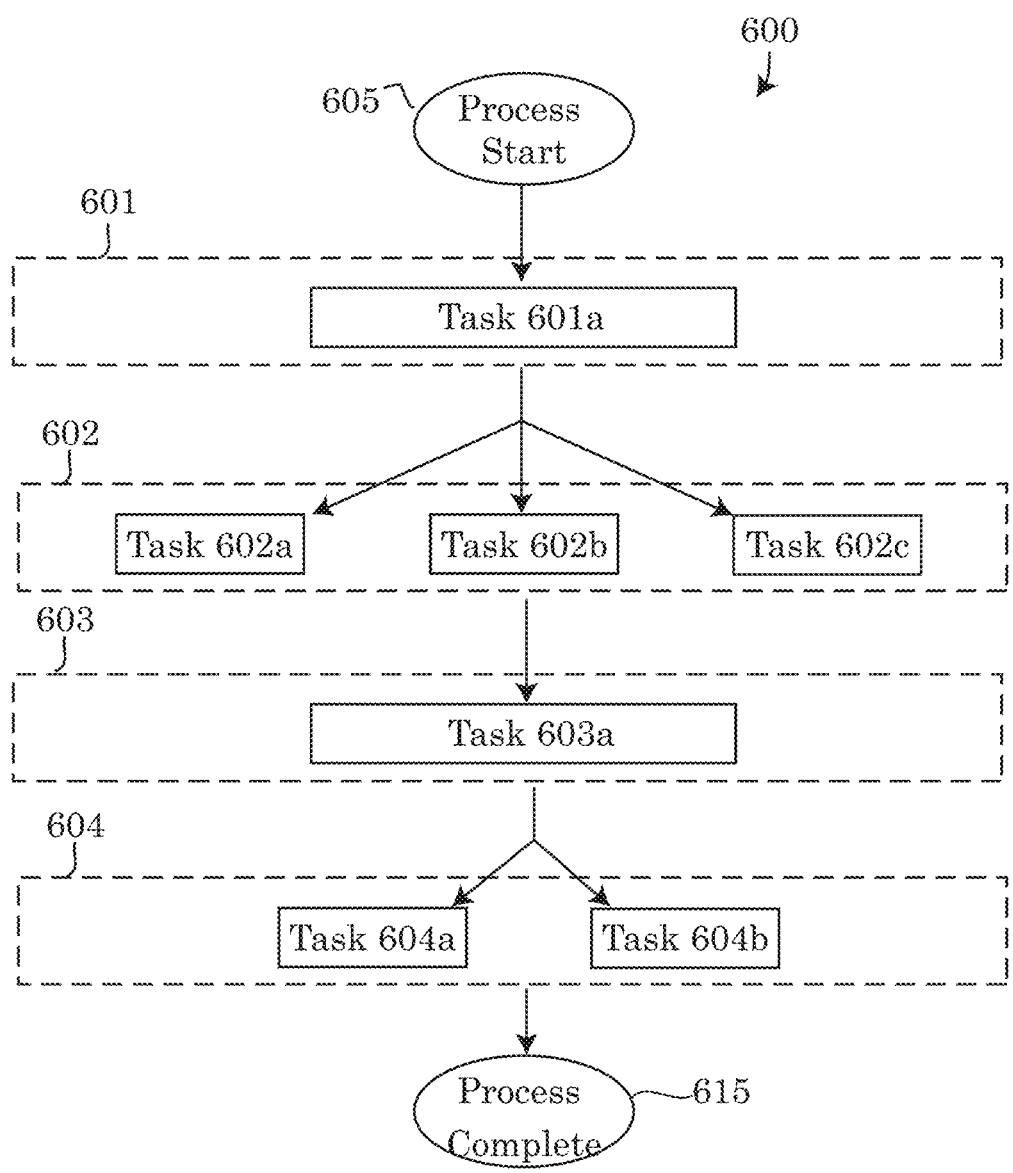
FIG. 6 depicts an embodiment of a plurality of tasks of a workflow process organized into a tier hierarchy.

Once the workflow process is created by the workflow management tools 217 in step 501, the workflow management tools 217 in step 503 may organize each task of the workflow process into a tiered hierarchy. The step of organizing the tasks of the workflow process into of the tiered hierarchy in step 503 allows for the workflow management tools 217 to calculate the order in which the tasks of the workflow process should be completed prior to the next task being scheduled for performance by the assigned task candidates. An example embodiment of a tiered hierarchy 600 is depicted in FIG. 6. It should be noted that a process may contain any number of tiers or tasks within a tier, depending upon the number and type of tasks that make may be present as part of the workflow process.

As shown in the embodiment of the tiered hierarchy 600, the tasks may be organized into a plurality of tiers 601, 602, 603, 604. Within each tier, a plurality of one or more tasks may be assigned to within the particular tier. Each of the tasks present within the tier may be assigned to one or more task candidates for the purposes of completing the tasks of the workflow process. However, in the tier hierarchy, each of the tasks within a present tier may be completed and/or scheduled with a due date before the completion of the plurality of tasks within a subsequent tier. For example, for the purposes of pre-scheduling the workflow process schedule, the tasks within the first tier 601 may be assigned due dates for the task completion chronologically before the due date of the tasks within the second tier 602. However, should one or more tasks of a previous tier fail to be completed, the due dates of subsequent tiers may also require adjustment in some circumstances to compensate for the missed dues dates of previous uncompleted tiers.

Referring still to the embodiment of the tier hierarchy 600, the workflow process may start 605 and the workflow management tools 217 may identify a first task 601a to be complete within the first tier 601. The identification of the first tier 601a may include each task that should be performed prior to the completion of any subsequent tasks of subsequent tiers. For example, in FIG. 6, it may be the company policy for projects to be approved by the accounting department budget before proceeding with the commencement of project. Using the budgetary approval as the example of task 601a, the projects budget may require approval before moving along the workflow process to a subsequent tier. If the budget was not approved, any of the subsequent steps could be meaningless to perform because there may not be any money or resources available to perform the tasks.

A tier may also include a plurality of co-equal or independent tasks within the tier, which may be completed in any order, so long as the entire tier of tasks is completed prior to the completion of any subsequent tiers in the hierarchy. As shown in FIG. 6, the second tier 602 and the fourth tier 604 each include a plurality tasks within each tier of the tier hierarchy 600. For example, a tier may include a series of approvals by separate divisions of a company before the process may move to the next tier, but the tasks may not be directly dependent on receiving approval from the other divisions. For instance, in the second tier 602, a first task 602a may require the IT department to sign off on the project, while a second task 602b may require approval of the legal department and a third task 602c may require approval by a policy review committee. In order to complete the second tier, task 602a, 602b and 602c should be completed by receiving approvals from all the requisite divisions before the workflow management tools moves on to the third tier 603 having a tier 3 task 603a. However, the order in which the completion of the second tier 602 tasks 602a, 602b, 602c, within a tier may not be dependent upon one another and may be schedule for completion in accordance with the availability of each responsible task candidate within a particular department.

Referring back to the high level flowchart of FIG. 5, after organizing each task of the workflow process in step 503 into a tiered hierarchy, in step 505, the workflow management tools 217 may retrieve calendar service data from the calendar services 235 and task service data from the task services 237. The retrieval of the calendar service data and task service data may be performed by the calendar retrieval agent 221 and the task retrieval agent 223 respectively, of the workflow management tools 217. The content of the calendar services data and task services data may be transmitted over the network 207 to the workflow owner computing system 214 and stored by a computer readable storage device of the computing system.

Figure 7:
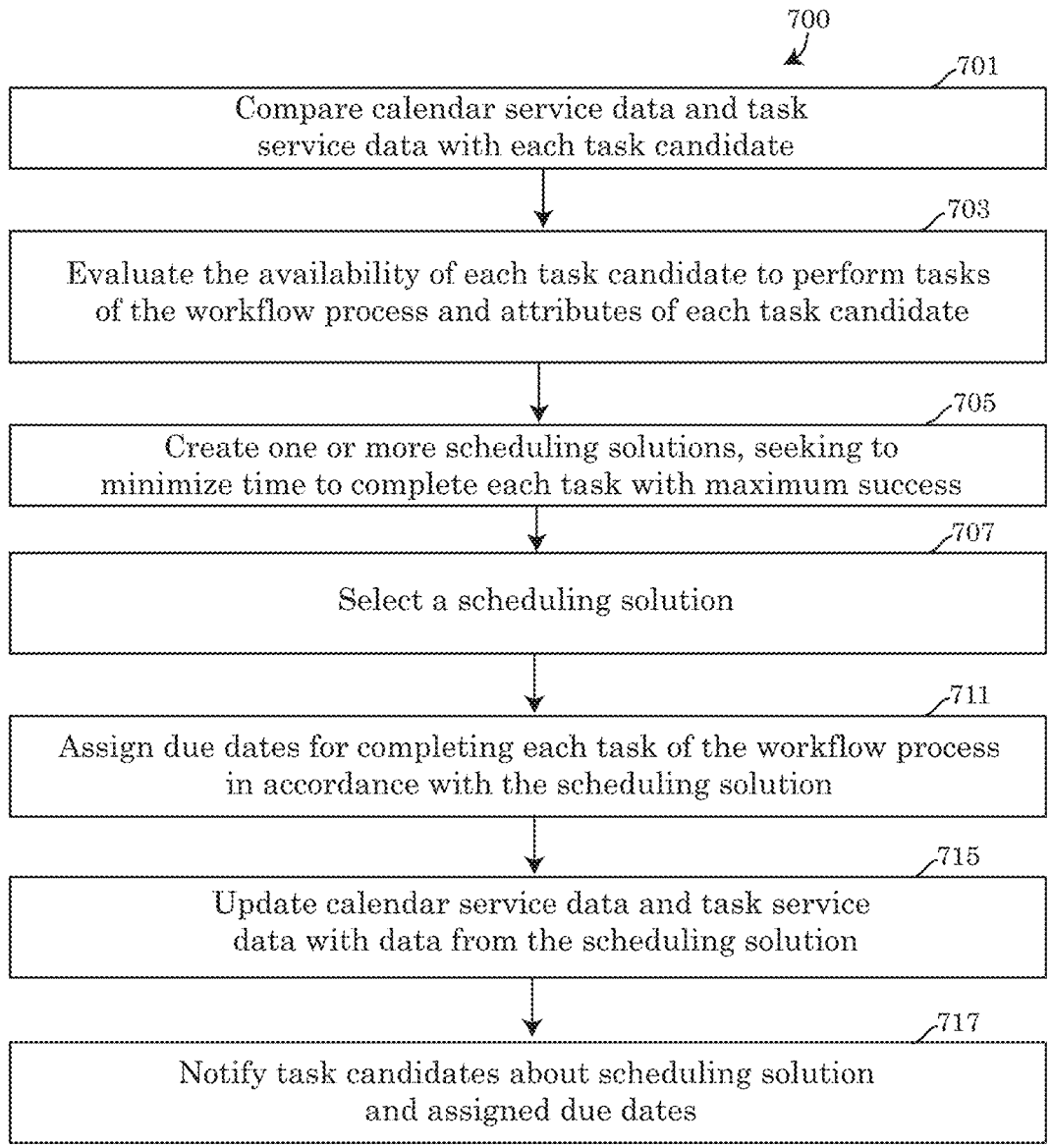
FIG. 7 depicts a flowchart of an embodiment generating a workflow process schedule.

Using the data collected in step 505, the workflow management tools 217 may generate a workflow process schedule as a function of the calendar service data and task service data retrieved by the calendar and task retrieval agents in conjunction with the negotiation agent 227. The "workflow process schedule" may refer to a sequence of tasks assigned to one or more particular task candidates for completion in a particular order, wherein each task is assigned a particular due date, by a particular task candidate. As discussed above, the workflow process management tools 217 may use the data collected from task services 237 and calendar services 235 to create a workflow process schedule which may balance a reduced cycle time for completing the workflow process with the likelihood of successfully completing the workflow process. FIG. 7 describes an embodiment of algorithm for generating the workflow process in greater detail.

In the exemplary embodiment 700, the flow chart of FIG. 7 describes the steps that may be taken to generate the workflow process schedule in accordance with step 507 of the high-level flow chart. Using the calendar service data and the task service data retrieved in step 505, the workflow management tools may, in step 701 compare the calendar service data and task service data retrieved between each of the task candidates. By comparing the calendar service data between each of the task candidates, the workflow management tools can, in step 703, evaluate the availability of each task candidate for performing a particular task of the workflow process. The evaluation step 703 may allow the workflow management tools 217 to determine which task candidates are immediately available to perform tasks, available in the near future, as well as identify those task candidates that are unavailable for an extended period of time wherein, if assigned, a particular task, the task candidate could delay the completion of the workflow process.

Not only may the workflow management tools evaluate the calendar service data to identify task candidates availability for being assigned one or more particular tasks, but the workflow management tools may, in step 703, also evaluate the attributes of each task candidate for the purposes of categorizing and prioritizing task candidates that may be more suitable for completing a particular task. Using the task services data retrieved from task services 237, the reliability optimization module 231 may evaluate each task candidate and assign one or more numerical values or scores to the attributes of each candidate and save the values as part of a task candidates' profile. The numerical values or scores of each attribute may be taken into consideration when creating a workflow process schedule and selecting the task candidates to assign to complete the tasks of the workflow process schedule.

In some embodiments, the attributes of each candidate may be considered to identify the reliability of a task candidate. Reliability may considered by the workflow management tools 217 when generating the workflow schedule because reliability may influence or be factored into the prediction of the success rate a task candidate may have for completing the workflow schedule as generated by the workflow management tools 217. The workflow management tools 217 may assess reliability of each task candidate and calculate the probability of each task candidate completing the assigned tasks on time. The workflow management tools 217 may also, in some embodiments, further consider other attributes of the task candidate when rating or prioritizing task candidates. Attributes of the task candidates that may be considered by the workflow management tools 217 for comparing and evaluating purposes, may include but are not limited to, the amount of errors identified in the task candidate's work, the rejection rate of task candidate's work, the rate at which a particular candidate has been instructed to re-do the work assigned in a particular task and the task candidates general flexibility to renegotiate and optimize the workflow schedule initially generated in step 509.

Embodiments of the workflow management tools 217 may use both the availability information from the calendar services 235, the reliability information derived from the task services 237 and other available data sources to create one or more potential workflow process schedules in step 705 (referred to as a scheduling solution) that may be implemented. The workflow management tools 217 in some embodiments may create a plurality of scheduling solutions in step 705. The goal of the workflow management tools may be to seek out or present scheduling solutions that minimize the time to complete the process while maximizing the probability of success. Each of the scheduling solutions created in step 705 may have different combinations of task candidates and assigned due dates, because different task candidates being selected for inclusion in the scheduling solutions may have different availabilities for completing assigned task, as determined by the workflow management tools 217 from the retrieved calendar service data. Also, different scheduling solutions may have varying probabilities of success because certain task candidates that are part of the plurality of different scheduling solutions may have differing degrees of reliability and favorable attributes that may make the tasks more or less likely to be completed on time.

In some embodiments, the workflow management tools may automatically select the best or most efficient scheduling solution in step 707 to be used as the workflow process schedule. The workflow management tools 217 may consider the best solution to be the scheduling solution having the lowest cycle time and the highest probability of success. However, it may be understood that in some instances, due to the availability of the most reliable task candidates, it may not be possible to obtain a scheduling solution having the minimum cycle time and maximum reliability. Under such circumstances, a programmed set of rules, algorithms, machine learning code or conditions may be used by the workflow management tools 217 to balance the cycle time for completing the workflow process while maintaining a high probability of success.

For example, a first scheduling solution may have a cycle time of 8 weeks to complete the workflow process and a probability of success for completing the workflow process of 98%, whereas a second scheduling solution may have a cycle time of 2 weeks and a probability of success of 95%, while a third scheduling solution has a cycle time of 4 days and probability of success of less than 50%. The workflow management tools 217 may be programmed with limitations or has recognized through machine learning what may be considered acceptable cycle times and probability for each workflow process as selected by the workflow owner. For instance, using the three workflow solutions described above, the workflow owner may set conditions that the cycle time must be less than 3 weeks and a probability of success must be greater than 90%. Using the parameters set, the first workflow solution may not be selected because it would take too long to complete the workflow process and the third solution would not be acceptable because the workflow process has too low a probability of being reliably completed. Thus the second solution may be selected by the workflow management tools because workflow process solution fits within the programmed limitations.

As noted in the above example, the workflow management tools 217 may select the best scheduling solution in step 707 to be implemented as the workflow process schedule automatically based on a programmed set of conditions of the workflow management tools 217, through machine learning code or as programmed by the workflow owner. In alternative embodiments, the workflow management tools 217 may present or display each workflow process solution to the workflow process owner and the workflow process owner may manually select the workflow process solution from the plurality of workflow process solutions created by the workflow management tools 217.

After the selection of the scheduling solution in step 707, the due dates for completing each task of the workflow process according to the selected solution, the workflow management tools 217 may assign the deadlines for completing each task to the responsible task candidates in step 711 by using the workflow management tools 217 to update the calendar service data and task service data for each responsible task candidate in step 715. Updating the calendar service data and task service data may allow for the calendar services 235 and task services 237 to properly display the deadlines and the assigned tasks on the computing systems of the task candidates responsible for completing the assigned tasks.

In some embodiments, the workflow management tools 217 may additionally perform step 717, notifying each of the task candidates that has been selected for completing the tasks of the workflow process. The step of notifying each of the responsible task candidates may be performed using notification system 219 of the task management tools. The notification performed during step 717 may provide the responsible task candidates with information regarding the selected workflow process solution in step 707, including the task they have been elected to perform and the due date for performing the tasks the task candidate is responsible for completing.

Referring back to the high level flow chart of FIG. 5, once step 507 has been completed, for example using the method described in the embodiment of FIG. 7, the workflow management tools in step 509 may determine whether or not the workflow process schedule generated in step 507 is optimal, and whether the generated workflow process schedule may be improved. If, the workflow process schedule is considered optimal in step 509, the workflow management tools may continue to step 517 and implement the workflow process schedule generated in step 507.

If however, in step 509, the workflow management tools 217 have not generated the optimal workflow schedule in step 507, the workflow management tools may perform a negotiation step between one or more of the responsible task candidates and the workflow management tools 217 to improve the workflow process schedule in step 511. Embodiments of the negotiation step may negotiate with task candidates to optimize the availability of one or more task candidates in order to reduce the overall cycle time and remove a bottle neck caused by one or more task candidates and/or increase the reliability of the task candidates assigned tasks by amending the schedule to include more reliable task candidates, or a combination of improvements thereof. In the exemplary embodiment, the negotiation of improvements may include presenting incremental amendments to the workflow process schedule. Incrementally requesting and receiving approvals for changes by task candidates that are affected and then identifying the next closest improvement and presenting a subsequent amendment to the workflow process schedule, until no remaining improvements can be presented for approval.

One example of an improvement may be described as follows: a workflow process generated in step 507 may have a cycle time of two months. However, the workflow management tools 217 may be able to identify that the availability of one or more particular task candidates are slowing down the overall cycle time. For instance one of the task candidates, such as a manager required to approve the workflow process. However the manager may not be able to approve the project until a particular date. The inability of the manager to make the approval until the date may have a cascading affect which further increase the cycle time because one or more particular responsible task candidates schedules does not allow for the task candidates to complete their tasks until later due to scheduling conflicts (such as a scheduled vacation or other project due dates). However, it may be identified by the workflow management tools 217 that if the manager approves the project sooner, the task candidates can avoid the scheduling conflicts of the task candidates performing the downstream tasks, allowing for the downstream tasks to be performed sooner as well, avoiding the potential bottleneck and reducing the overall cycle time. If the manager agrees to perform the approval sooner, the scheduling conflicts may be avoided and the assigned tasks can be performed prior to the scheduling conflicts, thus improving cycle time, or having to remove the conflicted task candidate for a less reliable one.

Figure 8:
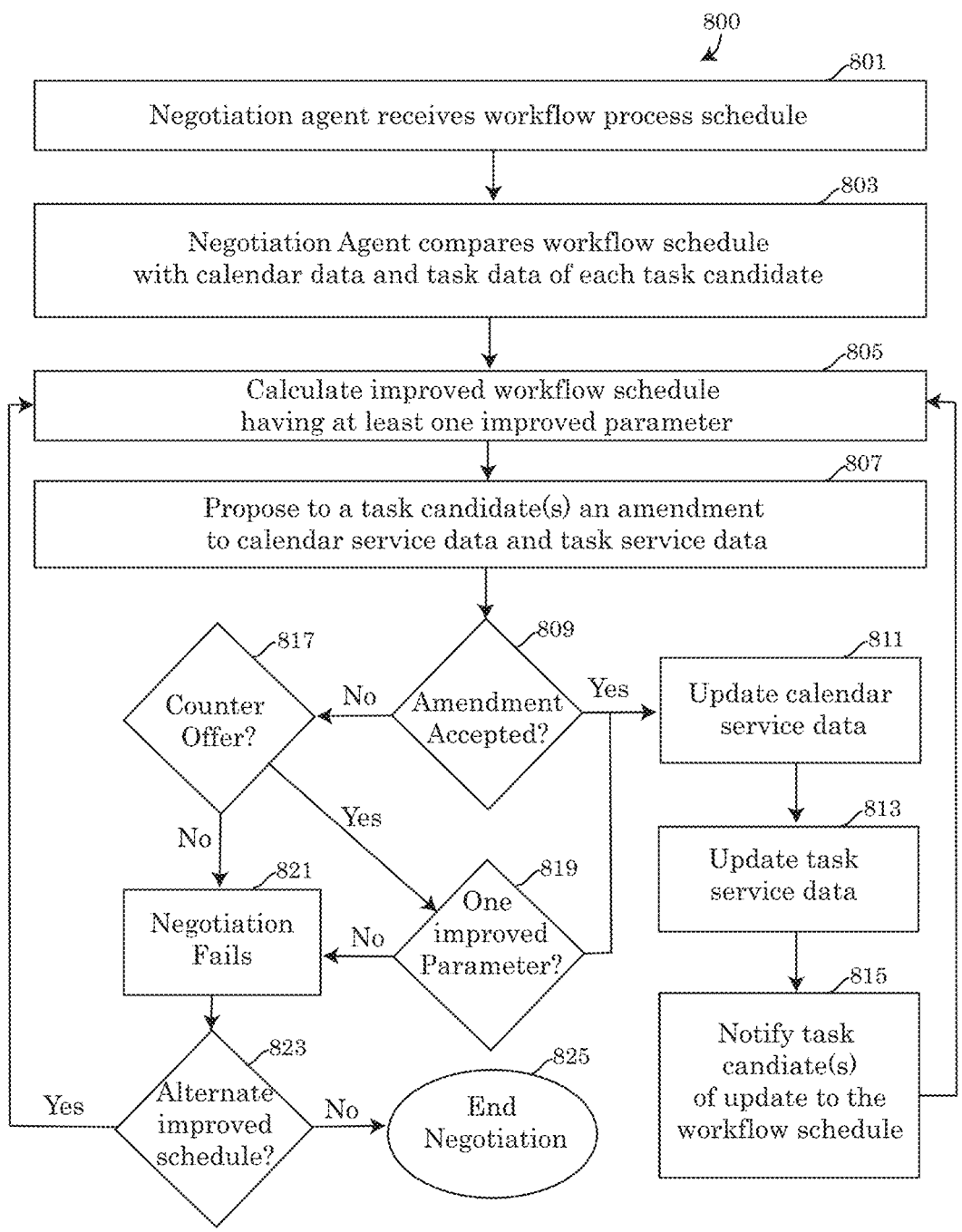
FIG. 8 depicts a flowchart of an embodiment for negotiating an improved workflow process schedule.

FIG. 8, describes an embodiment of an algorithm 800 for negotiating an improved workflow schedule having at least one improved parameter over the workflow process schedule generated in step 507. The improved parameter of the improved workflow process may include, but is not limited to, a reduced cycle time for completing the workflow process, an increased probability of successfully completing the workflow process on time, reduced probability of task failures, reduced probability of errors in completing the tasks and/or a reduced probability that one or more tasks may have to be re-performed. The negotiation steps may be performed by the negotiation agent 227 of the workflow management tools 217.

Figure 10:
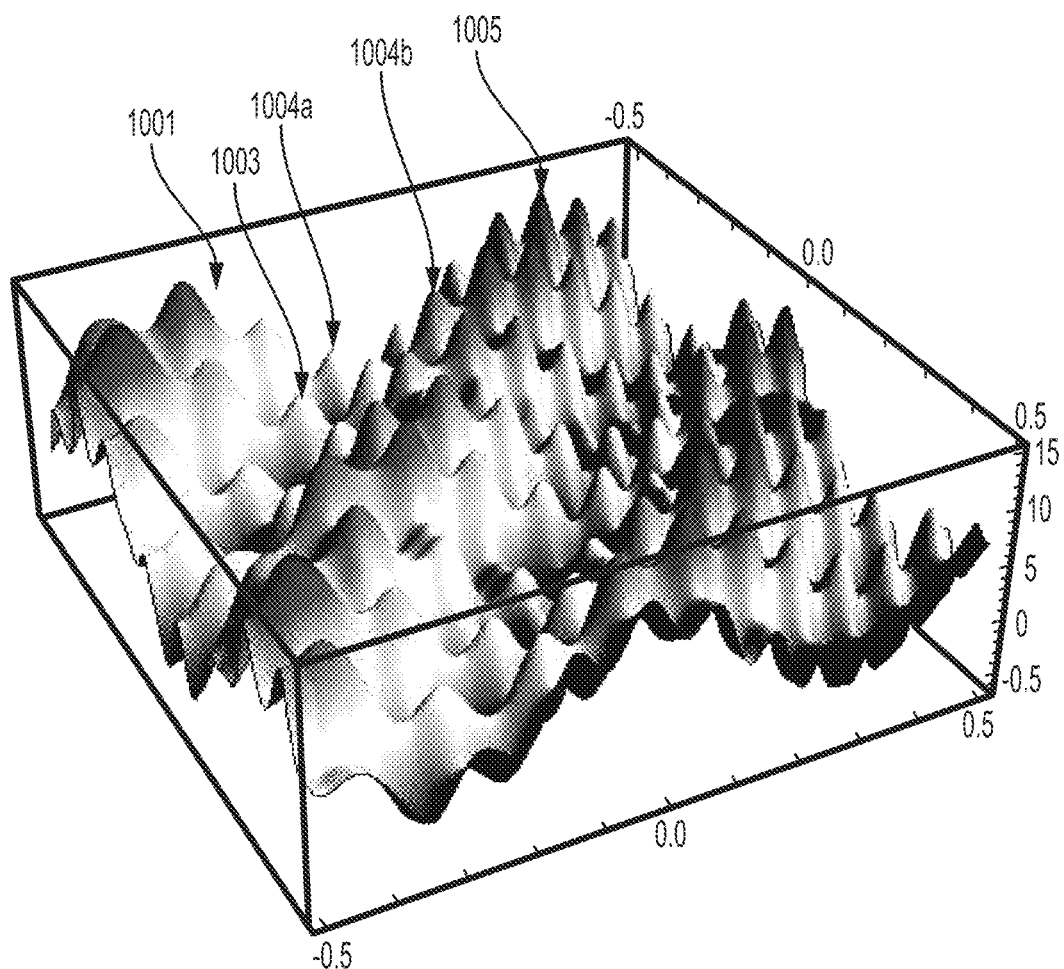
FIG. 10 illustrates a graphical embodiment of a plurality of workflow scheduling solutions and improved scheduling solutions.

Referring to algorithm 800, the negotiation agent 227 may initially receive in step 801, the workflow process schedule generated in step 507 of the high level flow chart. In step 803, the negotiation agent 227 may compare the generated workflow schedule with the calendar data and/or task date of each task candidate. In this step, the availability optimization module 229, reliability optimization module 231 and context awareness module 233 may identify one or more amendments that, if approved by one or more task candidates, would improve at least one parameter of the workflow schedule. The algorithm of the negotiation agent 227 seeking to improve the workflow process schedule may proceed to calculate in step 805 each potential improvement to the workflow process schedule. In some embodiments, the negotiation agent 227 may plot the improvements in a graphical format, as shown in FIG. 10, for each possible amendment resulting in a plurality of improved scheduling solutions.

Embodiments of the negotiation agent 227 may prioritize the calculated improvement space containing the plurality of improved scheduling solutions to identify incremental amendments that may be made to the workflow process schedule that are more likely to be accepted over drastic improvements which may be less likely to be accepted. The negotiation agent 227 may propose to task candidates incremental improvements to the generated workflow schedule in order to improve the parameters, one negotiation at a time. As the incremental improvements are successfully negotiated with the task candidates, the improved workflow schedule reaches closer and closer to the optimal workflow scheduling solution. In some embodiments, the negotiation agent 227 may prioritize workflow scheduling solutions that reduce cycle time without amending the task candidates responsible for completing the task, before proposing an amendment to the workflow process schedule that may involve amending the task candidate performing the assigned task(s). FIG. 10 depicts one example of the negotiation agent's graphical representation of the available scheduling solutions and improved scheduling solutions in an improvement space 1001. In this example, the initial scheduling solution 1003 may be selected by the negotiation agent. The negotiation may then seek to reach the optimal scheduling solution 1005 by incrementally engaging in the negotiation phase with the task candidates in order to amend the initial scheduling solution 1003 to an improved scheduling solution 1004*a*, 1004*b*. The negotiation agent 227 may continue to incrementally move towards the optimal scheduling solution 1005 one improvement at time, until either the optimal scheduling solution 1005 is achieved, or the closing improve scheduling solution to the optimal scheduling solution is achieved.

In step 807 of the embodiment 800, the negotiation agent 227 of the workflow management tools 217 may propose to a task candidate(s) an amendment to the calendar service data and/or task service data, affecting a change in the workflow process schedule as previously generated. In some embodiments, the amendment to the calendar and/or task data may be proposed to the task candidate(s) in the form of a dialog box or other communication means presented by the notification system 219. The notification system 219 may provide the task candidate(s), in some embodiments, an opportunity to accept the proposed amendment, reject the proposed amendment and/or counter-offer the proposed amendment.

Whether or not the amendment proposed by the workflow management tools 217 is accepted by the task candidate(s) may influence how the workflow management tools proceed with performing the workflow process. If, in step 809, the task candidate(s) accept the amendment proposed and presented by the negotiation agent 227, the workflow management tools may proceed to update the calendar service data in step 811, update the task service data in step 813 and notify, using the notification system 219, each of the candidates of the accepted amendment to the workflow process schedule in step 815. Subsequently, after the completion of step 815, the negotiation agent 227 may proceed back to step 805 to calculate and propose further improvements to the improved workflow process schedule.

In some embodiments, one or more amendments proposed by the workflow management tools 217 to the workflow process schedule may affect a plurality of task candidates responsible for tasks downstream of the proposed amendment. Under such circumstances where a proposed amendment would alter/affect the task due dates of more than one task candidate, the notification system 219 may request approval of the amendment from all task candidates affected by the proposed amendment. In some embodiments, the negotiation agent 227 may only implement the amendment to the workflow process schedule if each of the notified task candidates accepts the proposed amendment, otherwise, if even one of the affected task candidates reject the amendment to the workflow process schedule, the workflow management tools 217 may consider the amendment to be rejected.

On the other hand, if the amendment proposed in step 807 is not accepted in step 809, the algorithm 800 may proceed to step 817 to determine whether or not a task candidate has proposed a counter offer to the proposed amendment in step 807. If, in step 817, a counter-offer is proposed, the workflow management tools 217 may further determine in step 819 whether or not the counter-offer improves at least one parameter of the workflow process schedule. Step 819 may be performed by comparing the counter-offer amendment in step 817 with the current workflow process schedule currently approved for implementation. If the counter-offer improves at least one parameter of the workflow process schedule, and each task candidate affected by the counter-offer's proposed amendment is accepted, the workflow management tools 217 may proceed to step 811, 813 and 815, updating the calendar service data, task service data and notifying each task candidate of the accepted change facilitated by the acceptance of the counter-offer.

However, if the proposed amendment of step 807 is rejected by at least one affected task candidate in step 809, and there is no counter-offer in proposed in step 817 that would improve at least one parameter of the workflow process schedule, the algorithm may proceed to step 821, wherein the negotiation may be considered a failure. If the negotiation fails in step 821, the workflow management tools 217 may further determine whether or not alternative amendments may be presented which may improve the workflow process schedule in step 823. In some embodiments, if alternative amendments to the workflow schedule may be proposed, the workflow management tools 217 may proceed back to step 805, recalculate an improved workflow schedule and propose the new amendment to each of the task candidates affected in step 807 again. However, if no alternative amendments available in step 823, the negotiation step of the workflow management tools may be considered to have ended at step 825.

The negotiation phase of the workflow management tools 217 may continue to improve the workflow process schedule and/or request alternative amendments to the workflow process schedule in some embodiments until the negotiation agent 227 has either achieved the optimal workflow process solution and/or no additional alternative amendments to the workflow process schedule are available to proposed to the task candidates. If, at least one amendment has been made to the workflow process schedule that improves at least one parameter of the workflow process schedule, the negotiation for the purposes of step 513 of the embodiment of algorithm 500 may be considered successful. Accordingly, when the negotiation is successful, the algorithm 500 may proceed to step 515 and implement the improved workflow process schedule. Otherwise, if the negotiation by the negotiation agent 227 was not successful at step 513 and unable to amend the workflow process schedule to include at least one improved parameter, the algorithm 500 may proceed to step 517, wherein the workflow process schedule is implemented as generated in step 507.

Embodiments of the workflow management tools 217 may proceed to implement the workflow process schedule of step 517 or the improved workflow process schedule of step 515. As part of the implementation of the schedules 515, 517, the workflow management tools 217 may track in step 519, each of the tasks of the workflow process as they are scheduled to be completed in accordance with the implemented schedules of step 515 or 517. If a task of the implemented workflow schedules fails, and thus a task candidate fails to complete an assigned task of the implemented workflow process on time, the workflow management tools 217 may return back to step 505, and prepare a new workflow process schedule in accordance with steps 505 to 519 by accounting for the task failure and rescheduling each task from the point of the failure. Otherwise, if each of the workflow tasks is completed on time, in step 519, the workflow process may proceed to step 520 wherein the workflow process may be reported by the notification system 219 to the workflow owner as being complete.

Figure 9:
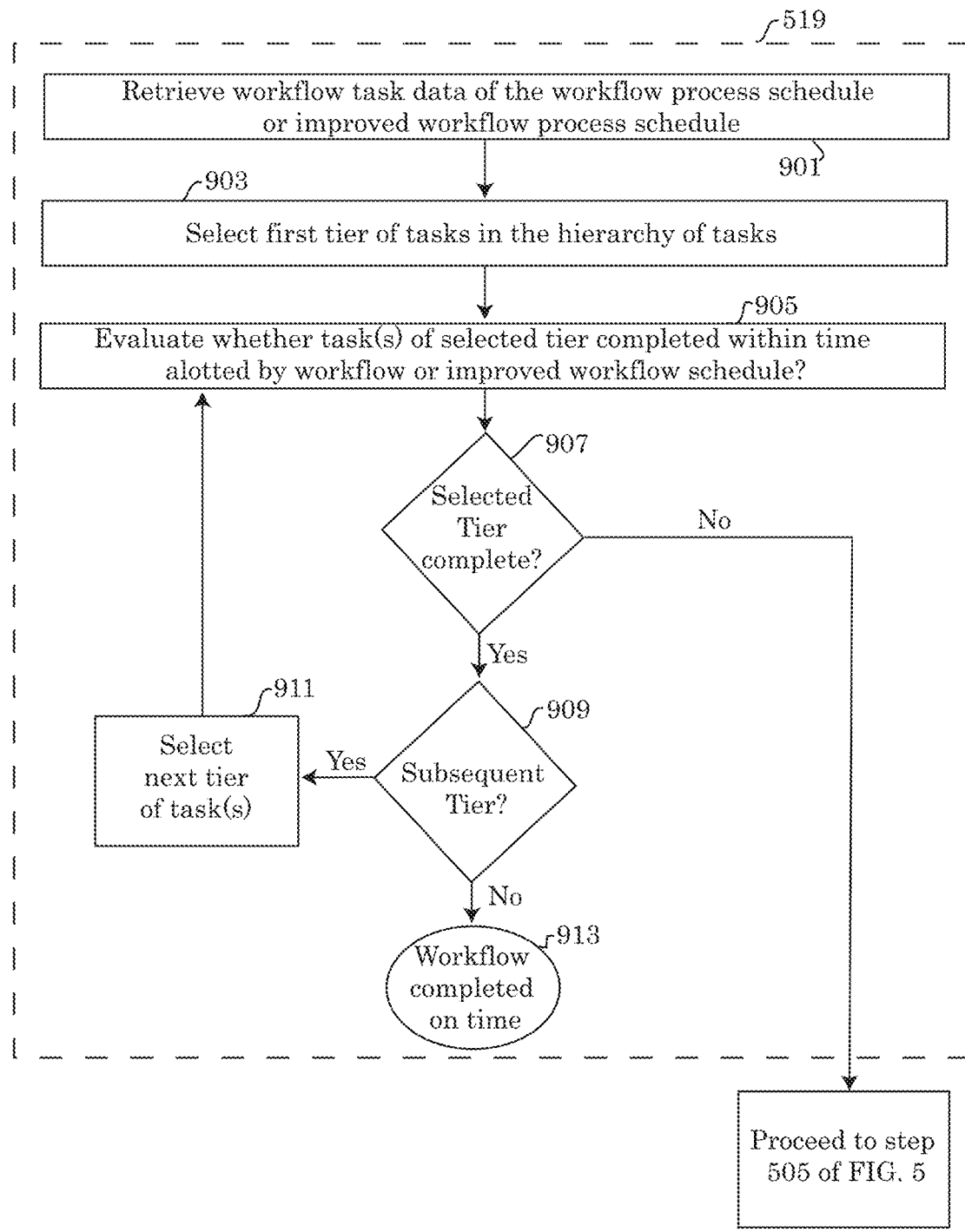
FIG. 9 depicts a flowchart of an embodiment for identifying the completion of a task in each tier of tasks in a hierarchy of tasks.

Determining whether or not each of the particular tasks of the workflow process has been completed in step 519 may be performed in some embodiments by using the algorithm presented in FIG. 9. In the exemplary embodiment, the tasks of the workflow process may be evaluated by the workflow management tools 217 on a tier by tier basis, by comparing the task services data with the workflow process schedule. In step 901, the workflow management tools 217 may retrieve task data of the implemented schedule 515,517 from the task services 237. The task tracking system 225 of the workflow management tools 217 may select the first tier of tasks in the hierarchy of tasks in step 903 and evaluate in step 905 whether the task(s) of the tier selected in 903 have been completed within the time allotted by the implemented schedule 515, 517. In order to ensure that the task candidates are completing the assigned tasks within the allotted due date, the task tracking system 225 may periodically compare the task service data at specific intervals, or on the date or time at which an assigned task is due according to the implemented workflow schedule at step 515 or 517.

At step 907, the task tracking system 225 will determine whether the selected tier has been identified as completed in the task services data, within the time allotted by the implemented workflow schedule. The determination made by the task tracking system 225 may be performed as a function of the evaluation step of step 905. If upon evaluation of the task service data, the task tracking system 225 identifies a task within the selected tier that has not been completed as of the due date of the implemented workflow process schedule, the workflow management tools 217 may re-perform step 505-519 as described above. In some embodiments, the notification system 219 may transmit a notification to the task candidate(s) who may have failed to fulfill the assigned task. Embodiments may further transmit notification to the workflow process owner informing the workflow process owner of the failure by the task candidate to complete a task of the implemented workflow schedule on time.

Alternatively, if in step 907 the task tracking system 225 determines that each of the tasks of the tier selected in step 903 have been completed in accordance with the implemented workflow schedule, the task tracking system 225 will identify in step 909 whether or not a subsequent tier exists in the tier hierarchy. If the task tracking system determines in step 909 that there is not another tier in the task hierarchy that exists in the workflow process, the workflow tasks will be calculated by the workflow management tools 217 to have been completed on time. Subsequently, the workflow management tools may be considered to have successfully completed the workflow process for the purposes of step 519. However, if an embodiment of the task hierarchy comprises a subsequent tier of tasks to be completed as part of the implemented workflow schedule, the next tier of tasks may be selected in step 911 by the task tracking system 225 and the workflow management tools may re-perform steps 905 through steps 913 as previously describes as a function of the tier selected in step 911.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for scheduling and optimizing completion of a workflow process, said method comprising:
    creating, by one or more computer processors, the workflow process comprising a plurality of tasks;
    organizing, by the one or more computer processors, task service data for a plurality of tasks of the workflow process into a tiered hierarchy comprising N tiers denoted as tiers 1, 2, . . . , N, N being at least 2, each tier having one or more tasks of the plurality of tasks being assigned to each tier, wherein each task in each tier n (n=1, . . . , N−1) before a last tier N of the hierarchy must be completed before each task in each subsequent tier n+1 has been completed, wherein each task in each tier is assigned to a respective task candidate of a plurality of task candidates that has a lowest cycle time for completion and has a highest probability of success, wherein the one or more tasks in a tier m (m=1, 2, . . . , N) comprises at least two independent tasks which are not dependent on one another and are scheduled to be completed in a specified sequential order in accordance with balancing an availability of each task candidate against a reliability of each task candidate, wherein the tiered hierarchy resulting from said organizing is a data structure identifying (i) the tiers hierarchically and (ii) the one or more tasks in each tier;
    retrieving, by the one or more computer processors, calendar service data of each task candidate of the plurality of task candidates, wherein the calendar service data includes scheduling information indicating, for each task candidate, whether or not each task candidate is available by a scheduled date to perform an assigned task of the plurality of tasks;
    determining, by the one or more computer processors, reliability data comprising the reliability of each task candidate, said reliability of each task candidate being a completion probability, based on at least one attribute of each task candidate, that a task assigned to each task candidate will be completed by each task candidate within a scheduled time frame, wherein the at least one attribute of each task candidate upon which the completion probability for each task candidate depends comprises at least two errors identified in each task candidate's previous work, a rejection rate of each task candidate's previous work, a rate at which each task candidate has been instructed to re-do work assigned to each task candidate in a particular task, or combinations thereof;
    generating, by the one or more processors, a plurality of workflow process schedules, wherein each workflow process schedule includes due dates for each task assigned to each task candidate, a time duration for completion of the workflow process, and an associated success probability of success for completing the workflow process within the time duration, wherein said generating the plurality of workflow process schedules utilizes the tiered hierarchy, the scheduling information, and the reliability data;
    selecting, by the one or more computer processors, a best workflow process schedule from the plurality of workflow process schedules, said selecting based on a programmed set of rules, algorithms, machine learning code, or combinations thereof;
    negotiating, by the one or more computer processors, an improved workflow process schedule having the lowest cycle time; and
    implementing the improved workflow process having the lowest cycle time in accordance with the selected best workflow process schedule.

2. The method of claim 1, wherein said selecting the best workflow process schedule is based at least on the programmed set of rules comprising one or more constraints that include an upper limit on the time duration and a lower limit on the associated success probability of success, and wherein said selecting based on the one or more constraints result in elimination of at least one workflow process schedule from the plurality of workflow process schedules, leaving a remaining one or more workflow process schedules.

3. The method of claim 1, wherein said retrieving comprises retrieving the calendar service data from a calendar service.

4. The method of claim 1, wherein said negotiating comprises:
    calculating the improved workflow process schedule having the at least one improved parameter, wherein the at least one improved parameter includes an increased success rate of the workflow process;
    proposing an amendment to the calendar service data of one task candidate of the plurality of task candidates;
    receiving an acceptance of the amendment to the calendar service data; and
    updating the calendar service data to reflect the amendment to the calendar service data.

5. A computer program product, comprising: one or more computer readable hardware storage devices having computer readable program code stored therein, said program code containing instructions executable by the one or more computer processors to implement a method for scheduling and optimizing completion of a workflow process, said method comprising:
    creating, by the one or more computer processors, the workflow process comprising a plurality of tasks;
    organizing, by the one or more computer processors, task service data for a plurality of tasks of the workflow process into a tiered hierarchy comprising N tiers denoted as tiers 1, 2, . . . , N, N being at least 2, each tier having one or more tasks of the plurality of tasks being assigned to each tier, wherein each task in each tier n (n=1, . . . , N−1) before a last tier N of the hierarchy must be completed before each task in each subsequent tier n+1 has been completed, wherein each task in each tier is assigned to a respective task candidate of a plurality of task candidates that has a lowest cycle time for completion and has a highest probability of success, wherein the one or more tasks in a tier m (m=1, 2, . . . , N) comprises at least two independent tasks which are not dependent on one another and are scheduled to be completed in a specified sequential order in accordance with balancing an availability of each task candidate against a reliability of each task candidate, wherein the tiered hierarchy resulting from said organizing is a data structure identifying (i) the tiers hierarchically and (ii) the one or more tasks in each tier;

retrieving, by the one or more computer processors, calendar service data of each task candidate of the plurality of task candidates, wherein the calendar service data includes scheduling information indicating, for each task candidate, whether or not each task candidate is available by a scheduled date to perform an assigned task of the plurality of tasks;

determining, by the one or more computer processors, reliability data comprising the reliability of each task candidate, said reliability of each task candidate being a completion probability, based on at least one attribute of each task candidate, that a task assigned to each task candidate will be completed by each task candidate within a scheduled time frame, wherein the at least one attribute of each task candidate upon which the completion probability for each task candidate depends comprises at least two errors identified in each task candidate's previous work, a rejection rate of each task candidate's previous work, a rate at which each task candidate has been instructed to re-do work assigned to each task candidate in a particular task, or combinations thereof;

generating, by the one or more processors, a plurality of workflow process schedules, wherein each workflow process schedule includes due dates for each task assigned to each task candidate, a time duration for completion of the workflow process, and an associated success probability of success for completing the workflow process within the time duration, wherein said generating the plurality of workflow process schedules utilizes the tiered hierarchy, the scheduling information, and the reliability data;

selecting, by the one or more computer processors, a best workflow process schedule from the plurality of workflow process schedules, said selecting based on a programmed set of rules, algorithms, machine learning code, or combinations thereof;

negotiating, by the one or more computer processors, an improved workflow process schedule having the lowest cycle time; and implementing the improved workflow process having the lowest cycle time in accordance with the selected best workflow process schedule.

6. The computer program product of claim 5, wherein said selecting the best workflow process schedule is based at least on the programmed set of rules comprising one or more constraints that include an upper limit on the time duration and a lower limit on the associated success probability of success, and wherein said selecting based on the one or more constraints result in elimination of at least one workflow process schedule from the plurality of workflow process schedules, leaving a remaining one or more workflow process schedules.

7. The computer program product of claim 5, wherein said retrieving comprises retrieving the calendar service data from a calendar retrieval agent.

8. The computer program product of claim 5, wherein said negotiating comprises:
calculating the improved workflow process schedule having the at least one improved parameter, wherein the at least one improved parameter includes an increased success rate of the workflow process;
proposing an amendment to the calendar service data of one task candidate of the plurality of task candidates;
receiving an acceptance of the amendment to the calendar service data;
updating the calendar service data to reflect the amendment to the calendar service data.

9. A computer system, comprising: one or more computer processors; one or more memories coupled to the one or more computer processors; and one or more computer readable storage devices coupled to the one or more computer processors, wherein the one or more storage devices contain program code executable by the one or more computer processors via one or more memories to implement a method for scheduling and optimizing completion of a workflow process, said method comprising:

creating, by the one or more computer processors, the workflow process comprising a plurality of tasks;

organizing, by the one or more computer processors, task service data for a plurality of tasks of the workflow process into a tiered hierarchy comprising N tiers denoted as tiers 1, 2, . . . , N, N being at least 2, each tier having one or more tasks of the plurality of tasks being assigned to each tier, wherein each task in each tier n (n=1, . . . , N−1) before a last tier N of the hierarchy must be completed before each task in each subsequent tier n+1 has been completed, wherein each task in each tier is assigned to a respective task candidate of a plurality of task candidates that has a lowest cycle time for completion and has a highest probability of success, wherein the one or more tasks in a tier m (m=1, 2, . . . , N) comprises at least two independent tasks which are not dependent on one another and are scheduled to be completed in a specified sequential order in accordance with balancing an availability of each task candidate against a reliability of each task candidate, wherein the tiered hierarchy resulting from said organizing is a data structure identifying (i) the tiers hierarchically and (ii) the one or more tasks in each tier;

retrieving, by the one or more computer processors, calendar service data of each task candidate of the plurality of task candidates, wherein the calendar service data includes scheduling information indicating, for each task candidate, whether or not each task candidate is available by a scheduled date to perform an assigned task of the plurality of tasks;

determining, by the one or more computer processors, reliability data comprising the reliability of each task candidate, said reliability of each task candidate being a completion probability, based on at least one attribute of each task candidate, that a task assigned to each task candidate will be completed by each task candidate within a scheduled time frame, wherein the at least one attribute of each task candidate upon which the completion probability for each task candidate depends comprises at least two errors identified in each task candidate's previous work, a rejection rate of each task candidate's previous work, a rate at which each task candidate has been instructed to re-do work assigned to each task candidate in a particular task, or combinations thereof;

generating, by the one or more processors, a plurality of workflow process schedules, wherein each workflow process schedule includes due dates for each task assigned to each task candidate, a time duration for completion of the workflow process, and an associated success probability of success for completing the workflow process within the time duration, wherein said generating the plurality of workflow process schedules utilizes the tiered hierarchy, the scheduling information, and the reliability data;

selecting, by the one or more computer processors, a best workflow process schedule from the plurality of workflow process schedules, said selecting based on a programmed set of rules, algorithms, machine learning code, or combinations thereof;

negotiating, by the one or more computer processors, an improved workflow process schedule having the lowest cycle time; and implementing the improved workflow process having the lowest cycle time in accordance with the selected best workflow process schedule.

10. The computer system of claim 9, wherein said selecting is based at least on the programmed set of rules comprising one or more, wherein said selecting the best workflow process schedule is based at least on the programmed set of rules comprising one or more constraints that include an upper limit on the time duration and a lower limit on the associated success probability of success, and wherein said selecting based on the one or more constraints result in elimination of at least one workflow process schedule from the plurality of workflow process schedules, leaving a remaining one or more workflow process schedules.

11. The computer system of claim 9, wherein said negotiating comprises:
    calculating the improved workflow process schedule having the at least one improved parameter, wherein the at least one improved parameter includes an increased success rate of the workflow process;
    proposing an amendment to the calendar service data of one task candidate of the plurality of task candidates;
    receiving an acceptance of the amendment to the calendar service data; and
    updating the calendar service data to reflect the amendment to the calendar service data.

* * * * *